United States Patent Office.

ELIZA DEXTER MURFEY, OF NEW YORK, N. Y.

Letters Patent No. 108,931, dated November 1, 1870.

IMPROVEMENT IN COMPOSITIONS FOR BEARINGS.

The Schedule referred to in these Letters Patent and making part of the same

I, ELIZA DEXTER MURFEY, of New York, county of New York, State of New-York, have invented an "Improved Composition for Bearings," &c., of which the following is a specification.

Nature and Object of the Invention.

My invention relates to compositions, such as are employed in a powdered or pasty state, as substitutes for ordinary lubricants, or in a condensed state as substitutes for metallic bearings.

My improved composition consists of pulverized plumbago, combined with finely-comminuted leather, hide, or skin, and (if necessary) with burnt hair and ivory-dust, and paraffine or its equivalent, holding rubber in solution.

The leather, hide, or skin, is torn, rasped, or otherwise finely comminuted, and is thoroughly mixed with plumbago, with which it is preferable to combine sufficient melted paraffine to form a liquid pasty mass.

After the shreds have become thoroughly impregnated with the plumbago, the mass is condensed under heat and pressure so as to expel nearly all the paraffine and form a hard solid block.

After the said block has become cool, it is broken up and then ground in any suitable grinding-machine to form a powder, which may be employed on bearings and journals in the same manner as the usual lubricating and bearing compositions.

Claims.

1. The composition for bearings and journals, &c., consisting of the ingredients herein described.

2. The process of manufacturing the said composition by combining and condensing the materials, forming a solid mass, and then grinding or comminuting the latter, as set forth.

In testimony whereof I have signed my name to this specification in the presence of two subscribing witnesses.

ELIZA DEXTER MURFEY.

Witnesses:
THOMAS PRUDEN,
J. ROMAIN BROWN.

*Assignor to The Manhattan Packing Manufacturing Company of Place.*